Figure 2:
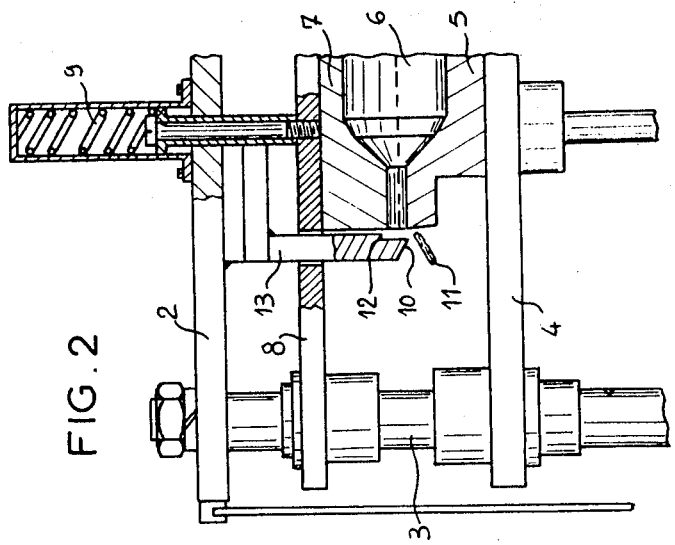

United States Patent

[11] 3,610,492

[72] Inventor Jacques Bourgeois
Lyon, France
[21] Appl. No. 833,123
[22] Filed June 13, 1969
[45] Patented Oct. 5, 1971
[73] Assignee Lesieur-Cotelle
Boulogne Sur Seine, France
[32] Priority June 17, 1968
[33] France
[31] 50,113

[54] CUTTING DEVICE ESPECIALLY FOR MACHINES FOR TRIMMING ARTICLES OF BLOWN PLASTIC MATERIAL
7 Claims, 5 Drawing Figs.
[52] U.S. Cl. .................................................. 225/95,
18/5 BS, 83/566, 83/622, 83/914
[51] Int. Cl. ..................................................... B26f 3/02
[50] Field of Search .......................................... 83/566,
567, 568, 570, 622, 914; 18/5 BS; 225/94, 95

[56] References Cited
UNITED STATES PATENTS

| | | | |
|---|---|---|---|
| 2,951,409 | 9/1960 | Berg ............................ | 83/622 X |
| 3,464,084 | 9/1969 | Thompson .................... | 83/914 X |
| 3,465,931 | 9/1969 | Rupert ......................... | 83/914 X |
| 3,494,520 | 2/1970 | Bewalda, Jr. et al. .......... | 225/94 |

Primary Examiner—William S. Lawson
Attorney—Waters, Roditi, Schwartz & Nissen

ABSTRACT: A cutting device for a trimming machine comprises a principal knife and a secondary knife, which can be positioned at a sufficient distance from the tangential trimming path of an article bearing scraps to be removed, to detach the scraps by the principal knife by stripping without cutting by shearing. The secondary knife is located downstream of and close to the principal knife to shear off any scraps which have withstood the action of the principal knife. The trimming machine can have a fixed upper plate to which the cutting device is rigidly fixed and movable lower plates to carry two mold halves enclosing the article. The movable plates move upwards against a spring anchored to the upper plate.

3,610,492

CUTTING DEVICE ESPECIALLY FOR MACHINES FOR TRIMMING ARTICLES OF BLOWN PLASTIC MATERIAL

The present invention relates to a cutting device, especially although not exclusively for machines for trimming articles of blown plastic material, since it is in this case that it is most advantageous.

In the trimming machines generally used, the elimination of scraps from bottles or other hollow articles of blown plastic material, is effected by the action of knives displaced tangentially to the bottle and perpendicularly to the plane of the joint of the mould, in which plane the scraps to be eliminated are situated. This elimination is hence achieved by cutting off or shearing. However, this method does not entirely give satisfaction, due to the fact that scraps sometimes persist after the shearing, at the place of their attachment to the body of the bottle or other article, leaving a cord or flash, disagreeable to the touch and due essentially to an untrue cutting of the scrap or to deformation of the bottle as a result of the force of cutting.

It is an object of the present invention to provide a device which obviates these drawbacks.

According to the invention there is provided a cutting device especially for a trimming machine, said device comprising on the one hand, a principal knife disposed at a sufficient distance from the path of the face or of the generator of the object bearing the scraps to be removed, to detach these latter by stripping without cutting them by shearing, the zone of implantation of the scraps being voluntarily weakened on moulding, by the edges themselves of the mould, for the purpose of facilitating this stripping, and on the other hand, a secondary knife placed behind the principal knife and very close to the aforesaid path, so as to effect cutting off by shearing of those scraps which have resisted the action of the main knife, for example by being deformed as a result of their very small size.

In a preferred embodiment of the invention, the principal knife is placed 3 mm. from the path of the face or from the generator supporting the scraps and the secondary knife is 0.3 mm. from this same path.

Figure 4:
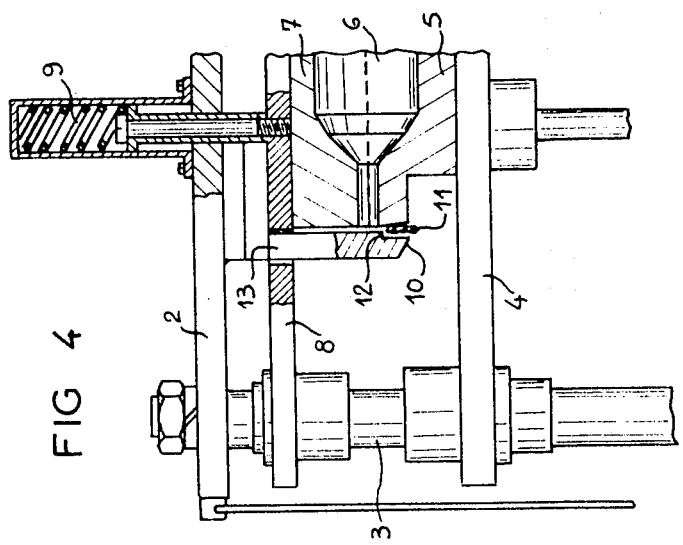
Figure 5:
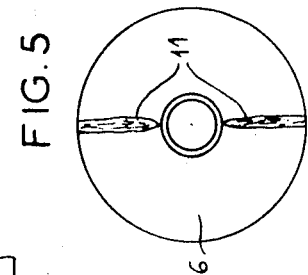

In order that the invention may be more fully understood, a preferred embodiment of the cutting device according to the invention is described below, purely by way of illustrative but nonlimiting example, with reference to the accompanying schematic drawing, in which:

FIGS. 1 to 4 are side elevation views partially in section of a portion of a trimming machine, illustrating various phases of trimming; and FIG. 5 is an end view, from the neck end, of a bottle before trimming.

Figure 1:
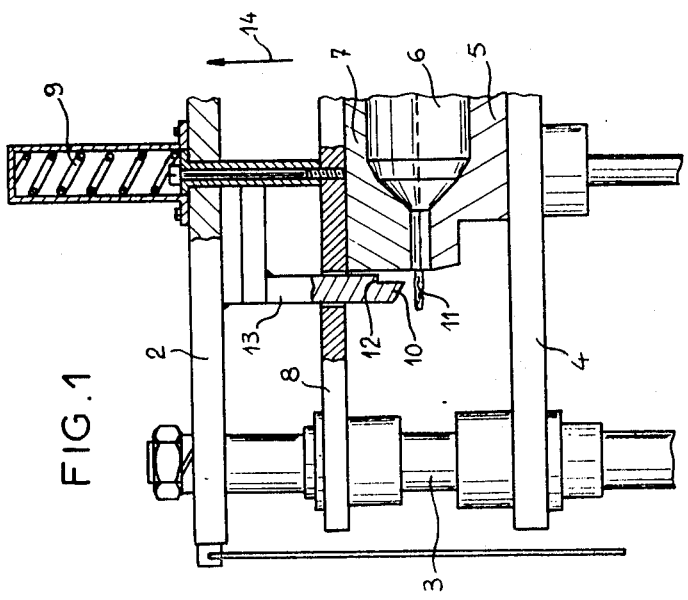

The drawing shows a machine for trimming bottles of plastic material, said machine comprising a thick plate 2, supporting two columns 3, of which one only is shown in the drawing, along which is displaced a movable plate 4 supporting a lower half-mould 5. The bottle 6 still carries scraps of which the root zone has been weakened by thinning in the course of moulding, so as to create a line of rupture along the profile of the bottle. As shown in FIG. 5, the bottle 6 is placed in the half-mould 5 which is displaced upwardly in the direction of the upper half-mould 7, until the mould is closed (FIG. 1). Continuing its rising displacement, the lower half-mould 5 entrains with it the upper half-mould 7 and its support plate 8, against the action of a spring 9 which urges the half-mould 7 to a normally low position.

A cutting device is provided and is composed essentially of a principal knife 10 and of a secondary knife 12 borne by a fixed support 13 rigidly attached to the plate 2, just above the low position of the upper half-mould 7.

The secondary knife 12 is situated much closer to the path of the edge of the plane of the joint of the half-moulds 5 and 7 than the principal knife 10. Moreover, the secondary knife 12 is situated above the principal knife 10 i.e. downstream of knife 10 with respect to the upward travel of the half-moulds 5 and 7.

The operation of trimming consists of displacing the two half-moulds 5 and 7 enclosing the bottle 6, adjacent the cutting device 10-12. The displacement of the lower half-mould 5 may be obtained by any mechanical, hydraulic, pneumatic or other known means.

Figure 3:
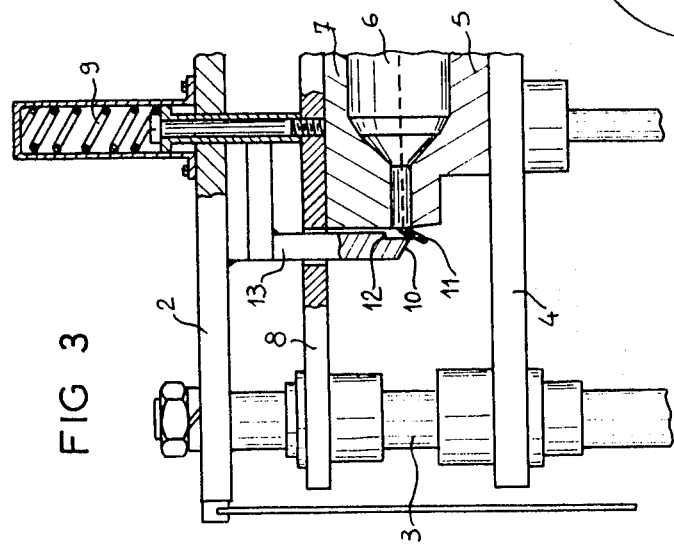

On their displacement upwards, in the direction of the arrow 14 (FIG. 1) the two half-moulds 5 and 7 pass the fixed cutting device 10–12 and the principal knife 10 effects stripping off of scraps as illustrated in FIG. 2. However, it is possible that, as a result of small thickness or short length, the scrap may flex and resist the action of the principal knife 10 as illustrated in FIG 3. In this case, this scrap will be sheared by the secondary knife 12 when it reaches its level, the half-moulds 5 and 7 having followed their ascending course until the plane of the joint of the half-moulds 5 and 7, that is to say the plane in which the scraps are situated, has passed the secondary knife 12, as illustrated in FIG. 4.

The driving means of the lower half-mould 5 then restores it to the low position, causing the opening of the mould when the upper half-mould 7 itself has reached its low position.

Means are provided for ejecting the trimmed bottle after opening the mould and placing a new bottle to be trimmed in the lower half-mould 5, when this half-mould has reached the low limit of its travel. The machine is then ready for a new trimming operation.

In the example described, the principal knife 10 and the secondary knife 12 are, respectively located 3 mm. and 0.3 mm. from the path of the edge of the plane of the joint of the two half-moulds 5 and 7.

It is self-evident that the present invention can be applied to any object other than a bottle of plastic material and that various distances of the knives with respect to the aforesaid path correspond to each characteristic or different nature of the articles to be trimmed. Various changes and modifications may be made in the embodiment described without departing from the essential concept of the invention as defined by the appended claims.

I claim:

1. A trimming machine for trimming scraps projecting from an article, said machine comprising means for supporting an article to be trimmed, a cutting device, and means for effecting relative movement between the cutting device and the supporting means so as to effect a trimming operation, said cutting device including a principal knife which, during a trimming operation, is arranged to engage scraps to be trimmed from the article at a distance from the article such that any scraps attached thereto are detached by a stripping action without cutting by shearing, said cutting device also including a secondary knife disposed closer to the article than the principal knife such that during the trimming operation, the secondary knife engages scraps not trimmed by the principal knife at a distance from the article which is closer to the article than the distance at which the principal knife engages the scraps so that the scraps are trimmed by a shearing action.

2. A machine as claimed in claim 1, wherein the principal knife is positioned a distance of 3 mm. from the article, and the secondary knife is positioned a distance of 0.3 mm. from the article.

3. A machine as claimed in claim 1 wherein said means for supporting the article to be trimmed comprises a mould within which the article is carried during a trimming operation, said mould comprising two separable half-moulds.

4. A machine as claimed in claim 3 wherein said cutting device is stationary and said mould is movable past the cutting device.

5. A machine as claimed in claim 4 wherein one half-mould is an upper half-mould and the other is a lower half-mould, said lower half-mould being arranged to be moved by the means for effecting relative displacement between a lowered position in which it is spaced from the upper half-mould and a position in which the lower half-mould engages the upper half-mould itself in a lowered position and to move the lower half-mould further upwardly so that the upper and lower half-moulds move together to effect a trimming operation of the article with the cutting device.

6. A machine as claimed in claim 5 comprising resilient means urging the upper half-mould to its lowered position.

7. A machine as claimed in claim 1 wherein said principal and secondary knives are relatively positioned with respect to the path of travel of the cutting device and supporting means such that the principal knife first passes the article for trimming scraps whereafter the secondary knife passes the article.